United States Patent
Bae et al.

(10) Patent No.: US 10,193,687 B2
(45) Date of Patent: Jan. 29, 2019

(54) METHOD FOR ACQUIRING SYNCHRONIZATION, AND PHY TRANSMITTER AND PHY RECEIVER FOR CABLE NETWORK

(71) Applicant: Electronics and Telecommunications Research Institute, Daejeon (KR)

(72) Inventors: Jae Hwui Bae, Daejeon-si (KR); Sang Jung Ra, Daejeon-si (KR); Jin Hyuk Song, Daejeon-si (KR); Dong Joon Choi, Daejeon-si (KR); Nam Ho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/441,799

(22) Filed: Feb. 24, 2017

(65) Prior Publication Data

US 2017/0324541 A1 Nov. 9, 2017

(30) Foreign Application Priority Data

May 9, 2016 (KR) .................. 10-2016-0056556

(51) Int. Cl.
*H04L 7/06* (2006.01)
*H04L 1/00* (2006.01)
(Continued)

(52) U.S. Cl.
CPC .............. *H04L 7/06* (2013.01); *H04L 1/0071* (2013.01); *H04L 5/005* (2013.01); *H04L 27/2613* (2013.01); *H04L 27/2657* (2013.01); *H04L 27/2663* (2013.01); *H04L 27/389* (2013.01); *H04L 5/0053* (2013.01); *H04L 27/2671* (2013.01); *H04L 27/2675* (2013.01); *H04L 69/323* (2013.01)

(58) Field of Classification Search
CPC ......... H04L 7/06; H04L 5/005; H04L 1/0071; H04L 69/323; H04L 27/389; H04L 27/2663; H04L 27/2657; H04L 27/2613; H04L 5/0053; H04L 27/2675; H04L 27/2671
See application file for complete search history.

(56) References Cited

U.S. PATENT DOCUMENTS

| | | | |
|---|---|---|---|
| 2008/0134262 A1 | 6/2008 | Jung et al. | |
| 2009/0147667 A1* | 6/2009 | Kang | H04L 27/2647 370/203 |
| 2016/0050095 A1 | 2/2016 | Atungsiri et al. | |

FOREIGN PATENT DOCUMENTS

| | | |
|---|---|---|
| KR | 1020120056640 A | 6/2012 |
| KR | 1020150121198 A | 10/2015 |

* cited by examiner

*Primary Examiner* — Vineeta S Panwalkar
(74) *Attorney, Agent, or Firm* — William Park & Associates Ltd.

(57) ABSTRACT

Disclosed are a method for acquiring synchronization in a cable network, and a physical (PHY) transmitter and PHY receiver. The method for acquiring synchronization in a cable network according to an embodiment includes receiving, by a PHY receiver, a signal from a PHY transmitter, and acquiring, by the PHY receiver, channel synchronization when a symbol in which a channel preamble exists is detected from the received signal and a position of a frequency in which a channel subcarrier exists is detected from the detected symbol by performing a cross correlation operation on the received signal and the channel preamble.

16 Claims, 13 Drawing Sheets

(51) Int. Cl.
  *H04L 5/00* (2006.01)
  *H04L 27/26* (2006.01)
  *H04L 27/38* (2006.01)
  *H04L 29/08* (2006.01)

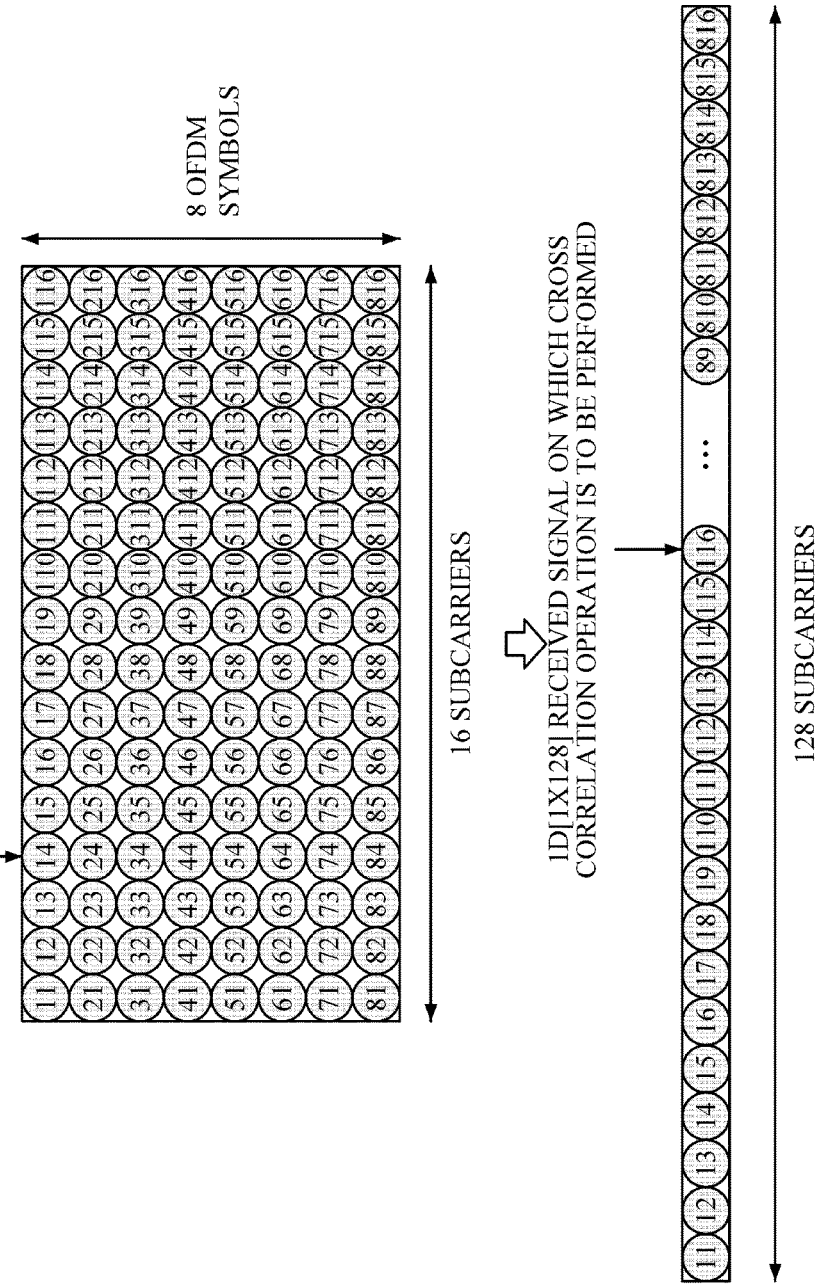

METHOD FOR ACQUIRING SYNCHRONIZATION, AND PHY TRANSMITTER AND PHY RECEIVER FOR CABLE NETWORK

CROSS-REFERENCE TO RELATED APPLICATION(S)

This application claims priority from Korean Patent Application No. 10-2016-0056556, filed on May 9, 2016, in the Korean Intellectual Property Office, the disclosure of which is incorporated herein by reference in its entirety.

BACKGROUND

1. Field

The following description relates to a cable network technology, and more particularly, to a technology for acquiring synchronization in a cable network.

2. Description of Related Art

A cable network is a network system that attracts attention in the field of remote access, and it may be connected to the Internet or an intranet to provide a variety of services such as telecommuting, video conferencing, web search, or the like to subscribers at a high data rate. A concept of a cable network has been made which has brought a cable television (CATV) network to a data communication field, and the cable network and the CATV are similar to each other in terms of using a coaxial cable. However, in a case of a CATV, an external coaxial cable is connected to a set-top box and then a TV is connected to the set-top box, whereas in a case of a cable network, the coaxial cable is connected to a subscriber device through a cable modem.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description relates to a method for acquiring synchronization in a cable network that may reliably acquire synchronization for the purpose of restoring a received signal in a physical (PHY) receiver of a cable network system, and a PHY transmitter and a PHY receiver.

In one general aspect, a method for acquiring synchronization in a cable network includes: receiving, by a PHY receiver, a signal from a PHY transmitter; and acquiring, by the PHY receiver, channel synchronization when a symbol in which a channel preamble exists is detected from the received signal and a position of a frequency at which a channel subcarrier exists is detected from the detected symbol by performing a cross correlation operation on the received signal and the channel preamble.

Here, the channel preamble may be a PHY layer link channel (PLC) preamble, the channel subcarrier may be a PLC subcarrier, and the channel synchronization may be PLC synchronization.

Also, the method for acquiring synchronization may further include converting the channel preamble on which the cross correlation operation is to be performed with the received signal from a two-dimensional (2D) type to a one-dimensional (1D) type.

Also, the method for acquiring synchronization may further include converting the received signal on which the cross correlation operation is to be performed with the channel preamble from a 2D type to a 1D type.

Also, the method for acquiring synchronization may further include selecting a received signal having the same size as the channel preamble from received signals.

Also, the selecting of the received signal may include selecting the received signal on which the cross correlation operation is to be performed in a unit of a signal with a preset size, the received signal being increased by a preset number of subcarriers with an increment of a preset size starting from a starting point of a PLC bandwidth in the received signal.

Also, the acquiring of the channel synchronization may include dividing the received signal into a real part and an imaginary part, performing the cross correlation operation on the channel preamble and each of the received signal in the real part and the received signal in the imaginary part, and generating a cross correlation sum by summing a real part cross correlation value and an imaginary part cross correlation value at the same sample position.

Also, the acquiring of the channel synchronization may include obtaining a position of a symbol having a cross correlation maximum value, and obtaining a subcarrier position on a frequency axis having the cross correlation maximum value.

Also, the acquiring of the channel synchronization may include determining a symbol position having a cross correlation maximum value as a first symbol position of the channel preamble and a subcarrier position on a frequency axis having the cross correlation maximum value as a frequency value at which the channel preamble starts.

Also, the method for acquiring synchronization may further include extracting a pattern of a pilot signal by detecting a position of the pilot signal arranged with respect to the channel preamble in the received signal; and estimating and equalizing a channel using the extracted pilot signal.

In another general aspect, a PHY transmitter in a cable network includes: an encoder that receives and encodes a channel bit stream; a mapper that maps the channel bit stream encoded by the encoder onto constellation values to generate a channel data signal; an interleaving unit that receives the channel data signal generated by the mapper and interleaves a channel preamble on which the cross correlation operation is to be performed with the received signal; and a pilot interleaving and modulating unit that receives the channel data signal interleaved with the channel preamble and interleaves and modulates a pilot signal.

Here, the channel bit stream may be a PHY layer link channel bit stream, the channel data signal may be a PLC data signal, and the channel preamble may be PLC preamble.

In still another general aspect, a PHY receiver in a cable network includes: a synchronizing unit that acquires channel synchronization when a symbol in which a channel preamble exists is detected from a signal received from a PHY transmitter and a position of a frequency at which a channel subcarrier exists is detected from the detected symbol by performing a cross correlation operation on the received signal and the channel preamble.

Here, the channel preamble may be a PHY layer link channel preamble, the channel subcarrier may be a PLC subcarrier, and the channel synchronization may be PLC synchronization.

Also, the synchronizing unit may convert the channel preamble on which the cross correlation operation is to be performed with the received signal from a 2D type to a 1D type, and convert the received signal on which the cross correlation operation is to be performed with the channel preamble from a 2D type to a 1D type.

Also, the synchronizing unit may select a received signal having the same size as the channel preamble from received signals.

Also, the synchronizing unit may divide the received signal into a real part and an imaginary part, perform the cross correlation operation on the channel preamble and each of the received signal in the real part and the received signal in the imaginary part, and generate a cross correlation sum by summing a real part cross correlation value and an imaginary part cross correlation value at the same sample position.

Also, the synchronizing unit may obtain a position of a symbol having a cross correlation maximum value, and obtain a subcarrier position on a frequency axis having a cross correlation maximum value.

Also, the synchronizing unit may determine a symbol position having a cross correlation maximum value as a first symbol position of the channel preamble and a subcarrier position on a frequency axis having the cross correlation maximum value as a frequency value at which the channel preamble starts.

Also, the PHY receiver may further include: a channel estimating and equalizing unit that extracts a pattern of a pilot signal by detecting a position of the pilot signal arranged with respect to the channel preamble in the received signal, and estimates and equalizes a channel using the extracted pilot signal.

Other features and aspects will be apparent from the following detailed description, the drawings, and the claims.

BRIEF DESCRIPTION OF THE DRAWINGS

FIG. 13 is a reference diagram illustrating an example of converting a 2D received signal on which a cross correlation operation is to be performed into a 1D signal in an 8K-FFT mode according to an embodiment of the present invention.

Figure 1:
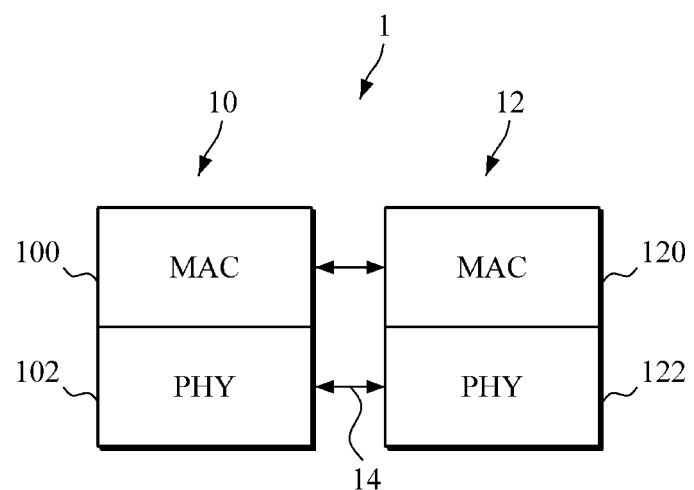
FIG. 1 is a block diagram illustrating a cable network system according to an embodiment of the present invention.

Throughout the drawings and the detailed description, unless otherwise described, the same drawing reference numerals should be understood as referring to the same elements, features, and structures. The relative size and depiction of these elements may be exaggerated for clarity, illustration, and convenience.

DETAILED DESCRIPTION

Advantages and characteristics of the present invention and methods for achieving them should become apparent with reference to exemplary embodiments described in detail below in addition to the accompanying drawings. However, the present invention is not limited to the exemplary embodiments which will be described below but may be implemented in various forms. The exemplary embodiments are merely provided to enable the present invention to be completely disclosed and the scope of the present invention to be easily understood by those of ordinary skill in the art, and the present invention is defined by the scope of the appended claims. Throughout the specification, like elements refer to like reference numerals.

In the following explanations, when a detailed description of well-known functions or configurations is determined to unnecessarily obscure a gist of the present invention, the detailed description thereof will be omitted. Terminology described below is defined considering functions in the present invention and may vary according to an intention of a user or operator or a usual practice. Thus, the meanings of the terminology should be interpreted based on the overall context of the present invention.

Combinations of respective blocks in the appended block diagrams and respective steps in the appended flowchart may be performed by computer program instructions (an execution engine). Since these computer program instructions can be stored in a processor of a general-purpose computer, a special-purpose computer, or other programmable data processing equipment, the instructions executed by a processor of a computer or other programmable data processing equipment generate a means for performing functions described in respective blocks of the block diagrams or respective steps of the flowchart. These computer program instructions can be stored in a computer-usable or computer-readable memory for a computer or other programmable data processing equipment to implement a function in a specific way, and thus the instructions stored in the computer-usable or computer-readable memory can also produce an item including an instruction means for performing functions described in respective blocks of the block diagrams or respective steps of the flowchart.

Since computer program instructions can also be stored in a computer or other programmable data processing equipment, instructions for performing a series of operation steps on a computer or other programmable data processing equipment, generating a computer-executable process, and running the computer or other programmable data processing equipment can also provide steps for performing functions described in respective blocks of the block diagrams or respective steps of the flowchart.

Each block or step may indicate a part of a module, segment, or code including one or more executable instructions for performing specified logical functions, and in some alternative exemplary embodiments, functions mentioned in blocks or steps can be performed out of order. For example, two blocks or steps illustrated in succession can be performed at substantially the same time, and blocks or steps can be performed in a reverse order of the corresponding function.

The above-mentioned purposes, characteristics, and advantages should be further apparent through the following description with reference to the accompanying drawings, and those of ordinary skill in the art should be able to easily implement the spirit of the present invention.

FIG. 1 is a block diagram illustrating a cable network system according to an embodiment of the present invention.

Referring to FIG. 1, a cable network system 1 includes a network termination modem 10 and a cable modem (CM) 12. The network termination modem 10 may be a cable modem termination system (CMTS). The network termination modem 10 may be included in a head-end, and the cable modem 12 may be included in a subscriber device. The network termination modem 10 and the cable modem 12 may be connected to each other through a distribution network. The distribution network may be a coaxial cable and may include other coaxial components.

The cable network system may follow a data over cable service interface specification (hereinafter, referred to as "DOCSIS") 3.1 transmission protocol. Hereinafter, for convenience of description, description will be made focusing on a DOCSIS 3.1 cable network system, but the transmission protocol is not limited to the DOCSIS 3.1. For example, the DOCSIS 3.1 cable network system may use a next version of the DOCSIS specification which will be completed later, and may use Ethernet passive optical network (PON) over Coax (EPoC) or other open or private protocols according to a cable network.

The DOCSIS defines a standard interface protocol for the cable network system. A DOCSIS specification which has been recently advanced may provide channel bonding, multicasting support function enhancement, and the like for the purpose of transmitting high-capacity and high-quality data. As convergence of broadcasting and communication is in progress through Internet protocol (IP)-based transmission, the DOCSIS specification is situated as an infrastructure that can accommodate multimedia transmission services for broadcasting communication convergence in a specification for a cable network.

The network termination modem 10 and the cable modem 12 have media access control (hereinafter, referred to as "MAC") layers 100 and 120 and physical (hereinafter, referred to as "PHY") layers 102 and 122, respectively. Connection is possible between the network termination modem MAC layer 100 and the cable modem MAC layer 120, and connection is possible between the network termination modem PHY layer 102 and the cable modem PHY layer 122. The MAC layers 100 and 120 may be DOCSIS MAC layers or EPoC MAC layers. The PHY layers 102 and 122 may be DOCSIS PHY layers or EPoC PHY layers.

The network termination modem 10 may include a PHY transmitter, and the cable modem 12 may include a PHY receiver. The network termination modem 10 may transmit a down-stream to the cable modem 12, and the cable modem 12 may transmit an up-stream to the network termination modem 10. In the present invention, down-stream transmission and reception will be mainly described. The cable network system 1 may transmit the down-stream using multiple subcarriers. A channel signal having a scrambled channel signal may be included in the down-stream, and the corresponding channel signal may be a PLC signal and the scrambled channel signal may be a scrambled PLC signal. At this point, channel synchronization may be acquired using the channel signal, and the channel synchronization may be PLC synchronization.

Figure 2:
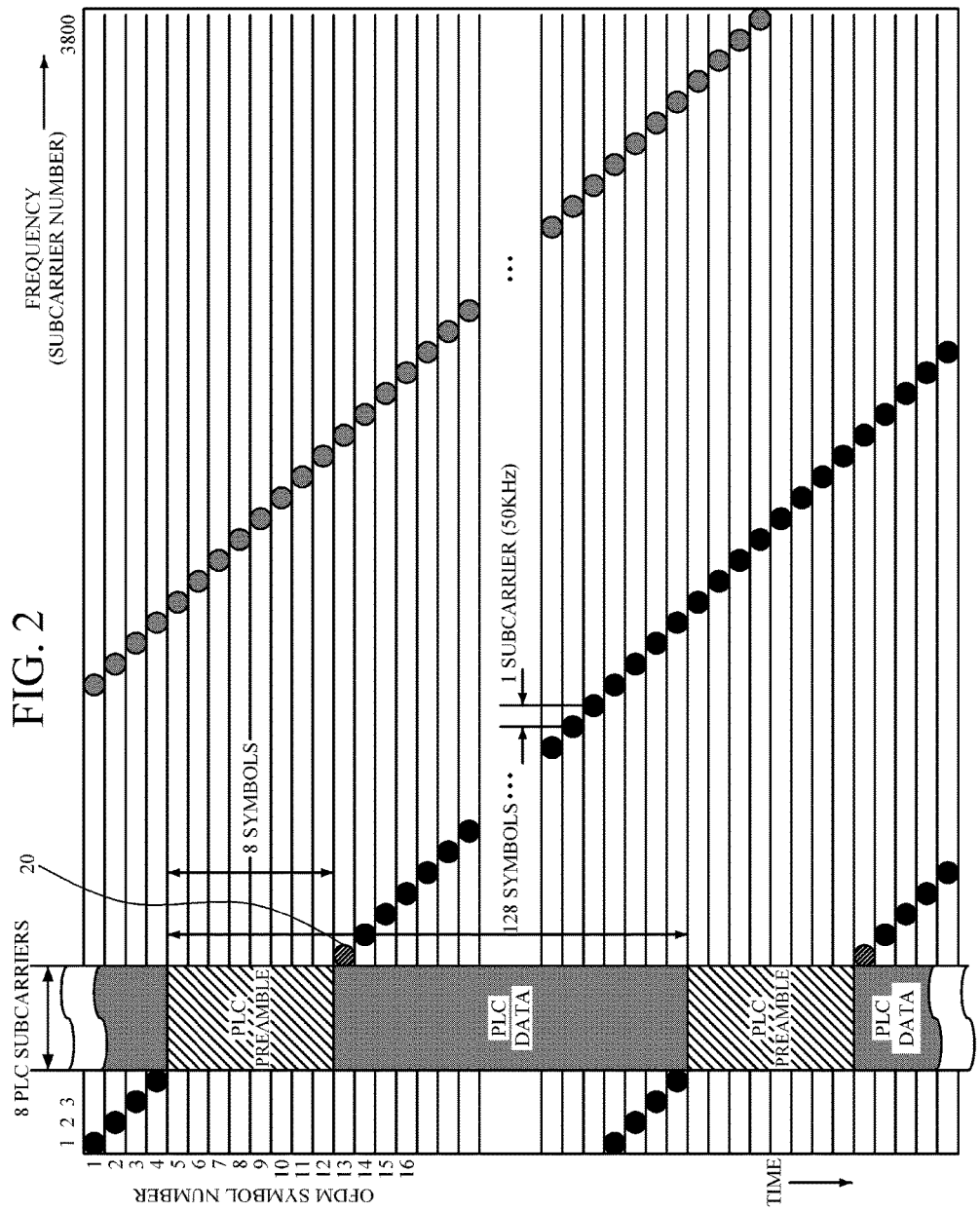
FIG. 2 is a structure diagram of a physical layer link channel (PLC) orthogonal frequency-division multiplexing (OFDM) symbol in a 4K-fast Fourier transform (FFT) mode of a data over cable service interface specification (DOCSIS) 3.1 cable network system for down-stream transmission to which the present invention is applied.
Figure 3:
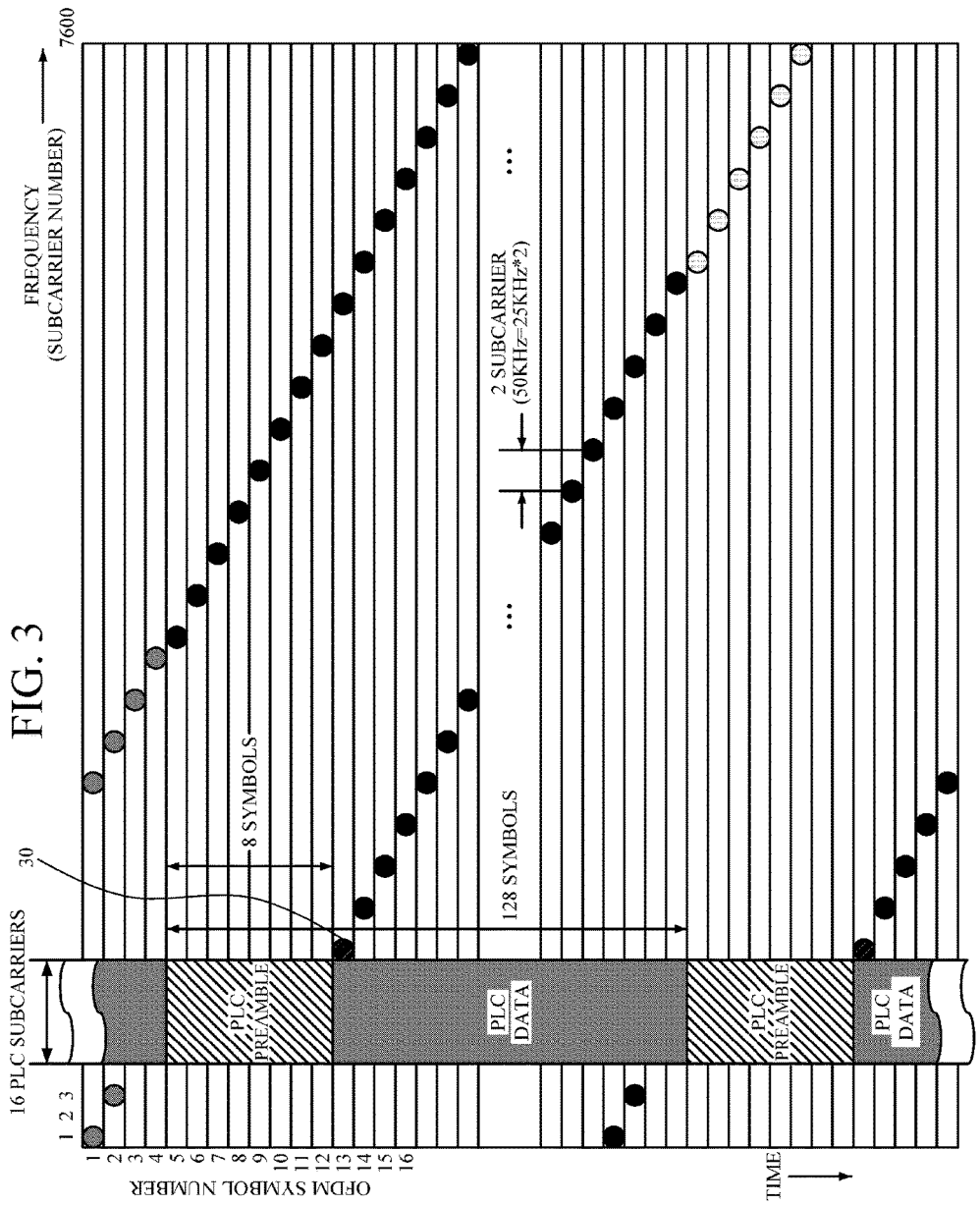
FIG. 3 is a structure diagram of a PLC OFDM symbol in an 8K-FFT mode of a DOCSIS 3.1 cable network system for down-stream transmission to which the present invention is applied.

FIG. 2 is a structure diagram of a physical layer link channel (PLC) orthogonal frequency-division multiplexing (OFDM) symbol in a 4K-fast Fourier transform (FFT) mode of a DOCSIS 3.1 cable network system for down-stream transmission to which the present invention is applied, and FIG. 3 is a structure diagram of a PLC OFDM symbol in an 8K-FFT mode of a DOCSIS 3.1 cable network system for down-stream transmission to which the present invention is applied.

A PHY receiver of the DOCSIS 3.1 cable network system restores a received signal through frequency offset compensation, sampling offset compensation, and channel estimation/equalization processes existing in a received signal, and extracts modulation parameter information included in PLC data. The modulation parameter information may be an FFT size, a cyclic prefix (CP) size, a roll-off period size, a channel coding code rate, a time interleaving depth, or the like. To this end, a pattern of a scattered pilot signal included in a DOCSIS 3.1 down-stream signal should be able to be initially extracted.

The pattern of the scattered pilot signal of the down-stream has the following characteristics. The scattered pilot signal may be used for equalizing channels, and there is a slight difference in a pilot signal arrangement according to a 4K-FFT mode and an 8K-FFT mode. Referring to FIG. 2, a scattered pilot signal arrangement of the 4K-FFT mode may be moved by a position of one subcarrier in a high-frequency direction along with an increment in an OFDM symbol number based on a following subcarrier immediately after the end of a PLC subcarrier in an OFDM symbol 20 number 9 of the PLC data of FIG. 2, and may be moved by the position of one subscriber in a low-frequency direction along with a decrement in the OFDM symbol number.

As to the pattern of the scattered pilot signal, the same pattern may be repeated every 128 OFDM symbols using an OFDM symbol in which the PLC preamble starts as a starting OFDM symbol, as shown in FIG. 2. The OFDM symbol 20 number 9 of FIG. 2 may be a subcarrier based on the scattered pilot arrangement, and a scattered pilot signal may exist for every 128 subcarriers in a direction in which a frequency value is increased or decreased in the OFDM symbol 20 based on the subcarrier based on the scattered pilot arrangement. The scattered pilot signal may exist while being moved by the position of one subcarrier in a direction in which the frequency value is increased in OFDM symbol numbers 10 to 128 whenever the OFDM symbol number is incremented up to the OFDM symbol number 128 based on the following subcarrier immediately after the end of the PLC subcarrier in the OFDM symbol number 9. Whereas in OFDM symbol numbers 1 to 8, the scattered pilot signal may exist in the position being moved by one subcarrier position whenever the OFDM symbol number is decremented based on the reference subcarrier for the scattered pilot allocation.

The scattered pilot signal may not exist in the position of the subcarrier in which the PLC subcarrier exists, and when a position of the scattered pilot signal and a position of a continual pilot signal overlap each other, that position may be regarded as the continual pilot signal.

Meanwhile, in the 8K-FFT mode, when the OFDM symbol number is incremented based on the following subcarrier immediately after the end of the PLC subcarrier in an OFDM symbol 30 number 9 of FIG. 3, the scattered pilot signal is arranged while being moved by a position of two subcarriers in the direction in which the frequency value is increased, and when the OFDM symbol number is decremented, the scattered pilot signal is arranged while being moved by the position of two subcarriers in the direction in which the frequency value is reduced.

The OFDM symbol 30 number 9 of FIG. 3 may be a subcarrier based on the scattered pilot arrangement, and the scattered pilot signal may exist for every 128 subcarriers in a direction in which the frequency value is increased or decreased in the OFDM symbol 30. The scattered pilot signal is arranged while being moved by the position of the two subcarriers in the direction in which the frequency value is reduced in OFDM symbol numbers 1 to 8 whenever the OFDM symbol number is decremented up to the OFDM symbol number 1 based on the subcarrier based on the scattered pilot signal arrangement. The scattered pilot signal may exist while being moved by the position of two subcarriers in the direction in which the frequency value is increased in OFDM symbol numbers 10 to 128 whenever the OFDM symbol number is incremented up to the OFDM symbol number 128 based on a reference subcarrier.

As described above with reference to FIGS. 2 and 3, when the scattered pilot signal is arranged, a subcarrier in which there is no scattered pilot signal with respect to 128 OFDM symbols may exist, and thereby channel estimation performance may be degraded. In order to avoid this, the OFDM symbols may be divided into two symbol groups such as 64 OFDM symbol numbers 1 to 64 and 64 OFDM symbol numbers 65 to 128 in the 8K-FFT mode, and as to the first 64 OFDM symbol-group and the second 64 OFDM symbol-group, in a following OFDM symbol immediately after an OFDM symbol in which the scattered pilot signal is arranged, scattered pilot signals of the second 64 OFDM symbols may be arranged while being moved by a position of only one subcarrier. That is, one subcarrier spacing may exist between the first 64 OFDM symbol-group and the second 64 OFDM symbol-group.

When the scattered pilot signal is arranged to be deviated by the position of one subcarrier between the second 64 OFDM symbol-group, the scattered pilot signal may exist in the second OFDM 64 symbol-group in the position of a subcarrier in which there is no scattered pilot signal in the first 64 OFDM symbol-group. In this manner, the scattered pilot signal may exist in the positions of all of the subcarriers over the 128 OFDM symbols, and reliable channel estimation is possible in the positions of all of the subcarriers.

The scattered pilot signal may not exist in the position of the subcarrier in which the PLC subcarrier exists, and may be regarded as the continual pilot signal when the position of the scattered pilot signal and the position of the continual pilot signal overlap each other.

Figure 4:
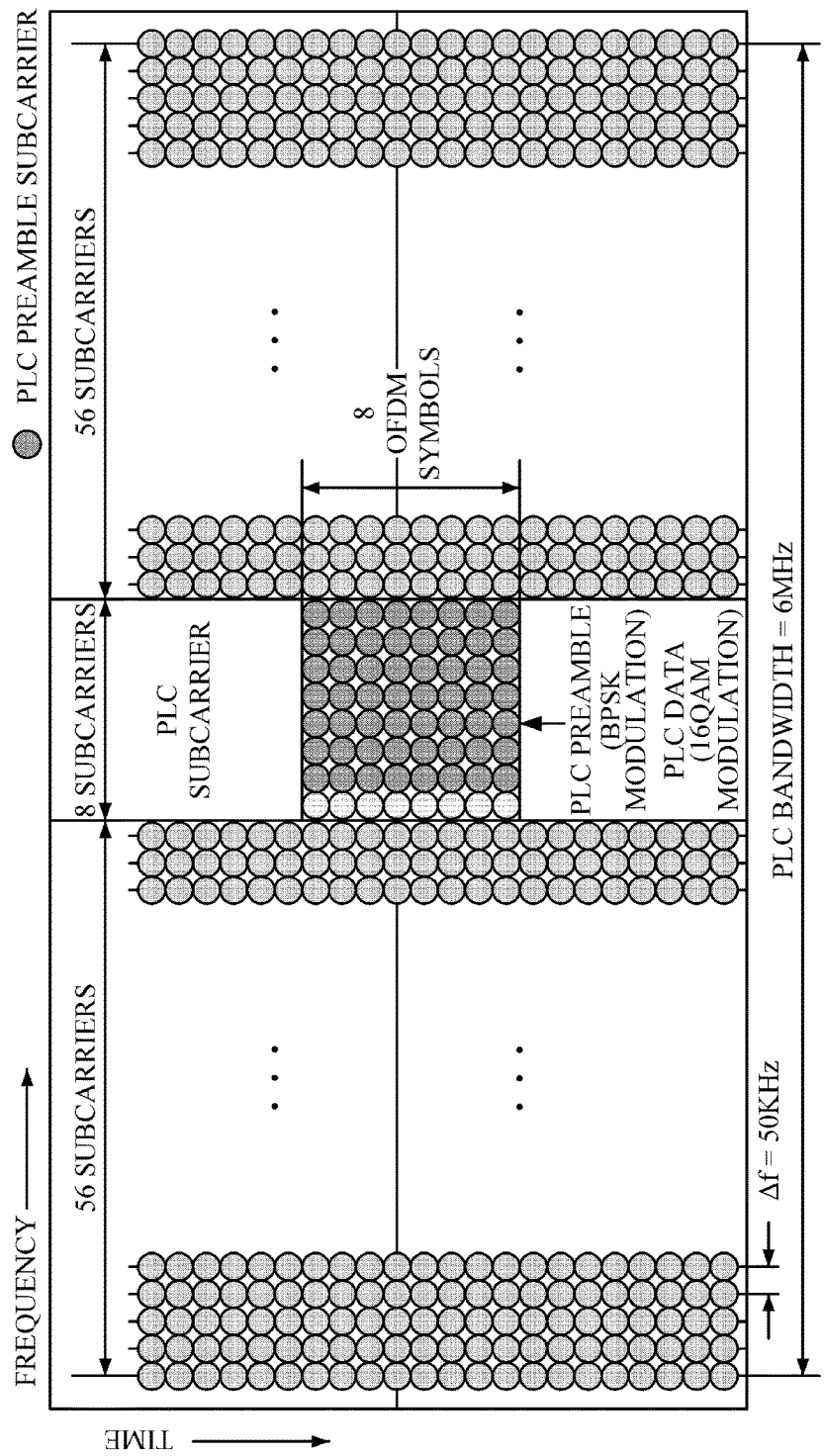
FIG. 4 is a structure diagram of subcarriers within a PLC bandwidth in a 4K-FFT mode of a DOCSIS 3.1 cable network system according to an embodiment of the present invention.
Figure 5:
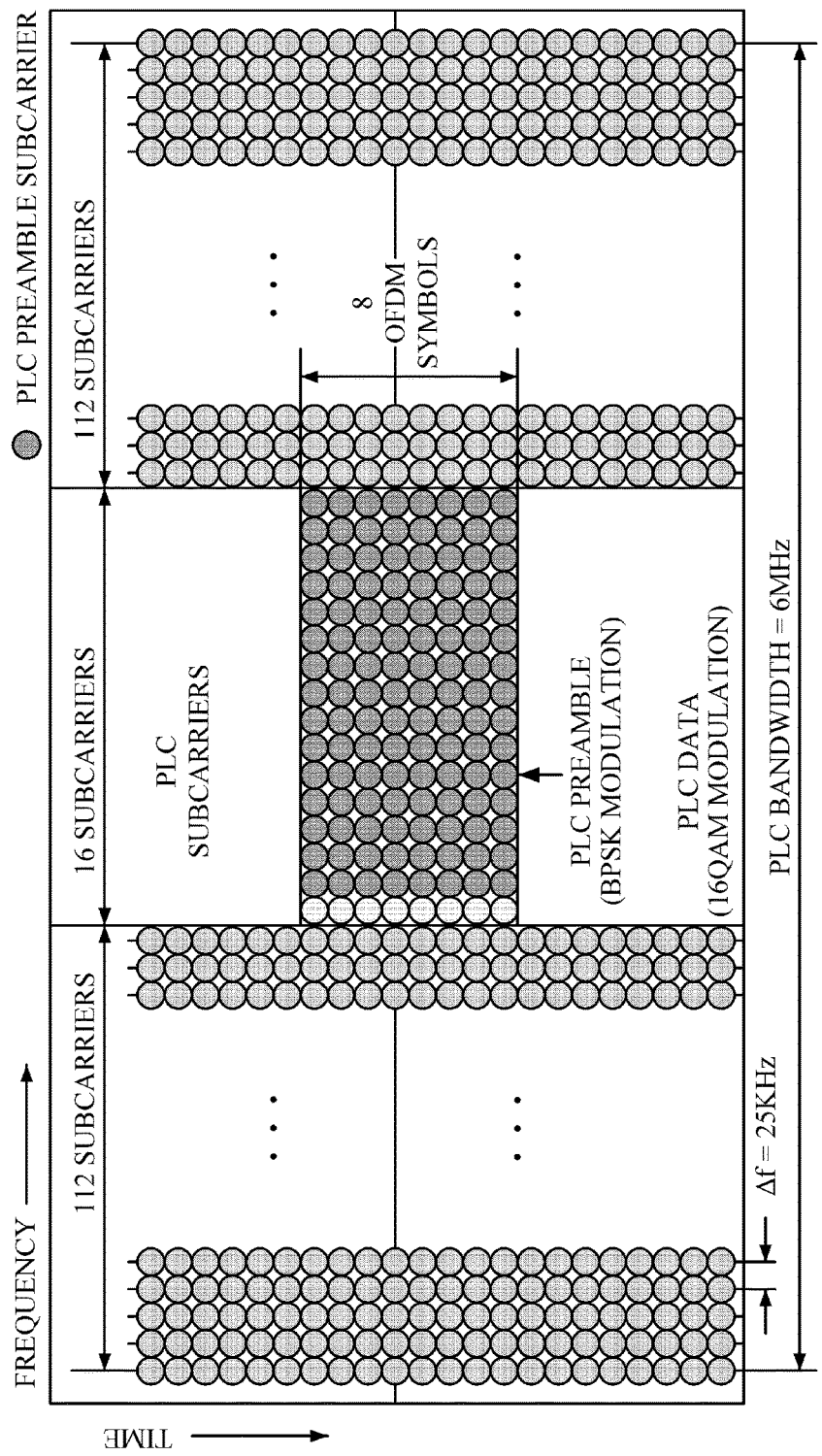
FIG. 5 is a structure diagram of subcarriers within a PLC bandwidth in an 8K-FFT mode of a DOCSIS 3.1 cable network system according to an embodiment of the present invention.

FIG. 4 is a structure diagram of subcarriers within a PLC bandwidth in a 4K-FFT mode of a DOCSIS 3.1 cable network system according to an embodiment of the present invention, and FIG. 5 is a structure diagram of subcarriers within a PLC bandwidth in an 8K-FFT mode of a DOCSIS 3.1 cable network system according to an embodiment of the present invention.

A PLC signal exists in all OFDM symbols of a DOCSIS 3.1 down-stream. The PLC signal may be constituted of a PLC preamble and PLC data, and constituted of a total of 128 OFDM symbols. The PLC preamble may be constituted of 8 OFDM symbols, and the PLC data may be constituted of 120 OFDM symbols. Thus, the PLC preamble may be repeated every 128 OFDM symbols. The PLC preamble may be subjected to binary phase shift keying (BPSK) modulation, and the PLC data may be subjected to 16 Quadrature Amplitude Modulation (QAM).

The PLC subcarrier has a 6 MHz bandwidth, and the 6 MHz bandwidth including the PLC subcarrier may exist while being moved by a unit of 1 MHz on a frequency axis. The PLC subcarrier exists in the middle of this 6 MHz bandwidth.

Referring to FIG. 4, a subcarrier spacing $\Delta f$ between subcarriers in the 4K-FFT mode is 50 KHz, and therefore 120 (($6 \times 10^6$)/($50 \times 10^3$)) subcarriers exist within the 6 MHz bandwidth and 56 subcarriers exist to the left and right sides of the PLC subcarrier, respectively. The 8 subcarriers positioned in the middle among the 120 subcarriers correspond to the PLC subcarrier.

Referring to FIG. 5, the subcarrier spacing $\Delta f$ between subcarriers in the 8K-FFT mode is 25 KHz, and therefore 240 (($6\Delta 10^6$)/($25\Delta 10^3$)) subcarriers exist within the 6 MHz bandwidth, and 112 subcarriers exist to the left and right sides of the PLC subcarrier, respectively. The 16 subcarriers positioned in the middle among the 240 subcarriers correspond to the PLC subcarrier.

Hereinafter, a structure of a PLC preamble signal will be described.

The PLC preamble signal has values of 0 and 1, but when the PLC preamble signal is transmitted, 0 is mapped onto +1 and 1 is mapped onto −1 so as to be converted into a BPSK modulation signal.

The PLC preamble signal is constituted of 8 subcarriers in a frequency domain and appears over 8 OFDM symbols in a time domain in the 4K-FFT mode. Values of an 8×8 PLC preamble matrix of the 4K-FFT mode are shown in Table 1.

|  | Symbol1 | Symbol2 | Symbol3 | Symbol4 | Symbol5 | Symbol6 | Symbol7 | Symbol8 |
| --- | --- | --- | --- | --- | --- | --- | --- | --- |
| Subcarrier 1 | 0 | 0 | 1 | 0 | 1 | 1 | 0 | 1 |
| Subcarrier 2 | 1 | 0 | 0 | 0 | 1 | 1 | 1 | 0 |
| Subcarrier 3 | 0 | 1 | 1 | 1 | 1 | 0 | 0 | 1 |
| Subcarrier 4 | 0 | 1 | 0 | 0 | 0 | 1 | 1 | 0 |
| Subcarrier 5 | 1 | 1 | 1 | 0 | 1 | 1 | 1 | 1 |

|  | Symbol1 | Symbol2 | Symbol3 | Symbol4 | Symbol5 | Symbol6 | Symbol7 | Symbol8 |
|---|---|---|---|---|---|---|---|---|
| Subcarrier 6 | 1 | 0 | 0 | 0 | 0 | 0 | 0 | 1 |
| Subcarrier 7 | 0 | 1 | 0 | 1 | 0 | 0 | 1 | 1 |
| Subcarrier 8 | 0 | 0 | 1 | 0 | 0 | 0 | 1 | 1 |

The PLC preamble signal is constituted of 16 subcarriers in a frequency domain and appears over 8 OFDM symbols in a time domain in the 8K-FFT mode. Values of a 16×8 PLC preamble matrix of the 8K-FFT are shown in Table 2.

TABLE 2

|  | Symbol1 | Symbol2 | Symbol3 | Symbol4 | Symbol5 | Symbol6 | Symbol7 | Symbol8 |
|---|---|---|---|---|---|---|---|---|
| Subcarrier 1 | 1 | 0 | 0 | 1 | 0 | 1 | 0 | 0 |
| Subcarrier 2 | 0 | 1 | 1 | 0 | 0 | 1 | 0 | 0 |
| Subcarrier 3 | 0 | 1 | 1 | 1 | 0 | 0 | 0 | 1 |
| Subcarrier 4 | 0 | 0 | 0 | 1 | 0 | 1 | 1 | 1 |
| Subcarrier 5 | 1 | 1 | 0 | 0 | 1 | 0 | 0 | 0 |
| Subcarrier 6 | 0 | 0 | 0 | 1 | 1 | 0 | 0 | 1 |
| Subcarrier 7 | 0 | 1 | 1 | 1 | 0 | 1 | 1 | 0 |
| Subcarrier 8 | 1 | 1 | 1 | 0 | 0 | 0 | 1 | 0 |
| Subcarrier 9 | 0 | 1 | 1 | 1 | 1 | 0 | 0 | 1 |
| Subcarrier10 | 1 | 1 | 1 | 1 | 0 | 1 | 1 | 1 |
| Subcarrier11 | 1 | 1 | 1 | 0 | 0 | 0 | 0 | 0 |
| Subcarrier12 | 1 | 1 | 0 | 1 | 0 | 1 | 0 | 1 |
| Subcarrier13 | 1 | 1 | 0 | 0 | 1 | 1 | 0 | 0 |
| Subcarrier14 | 1 | 0 | 1 | 1 | 1 | 0 | 1 | 0 |
| Subcarrier15 | 0 | 1 | 0 | 1 | 1 | 0 | 0 | 0 |
| Subcarrier16 | 0 | 0 | 1 | 0 | 0 | 0 | 0 | 1 |

The present invention relates to a method that extracts a scattered pilot signal and a continual pilot pattern for compensating for frequency offset, compensating for sampling offset, and estimating/equalizing channels in a PHY receiver of a DOCSIS 3.1 cable network system, and acquires PLC synchronization for extracting a modulation parameter included in PLC data.

The PLC synchronization is used for the PHY receiver that receives a down-stream to find a reference point of the scattered pilot signal arrangement which is repeated every 128 OFDM symbols included in the received signal and to extract the scattered pilot signal pattern and the continual pilot pattern for being applied to frequency offset compensation, sampling offset compensation, and channel estimation/equalization. In addition, the PLC synchronization is required for extracting modulation parameter information such as an FFT size, a CP size, a roll-off period size, a channel coding code rate, a time interleaving depth, and the like which are included in the PLC data. Accordingly, in the PHY receiver of the DOCSIS 3.1 cable network system, the PLC synchronization is necessarily required for restoring the received signal.

Figure 6:
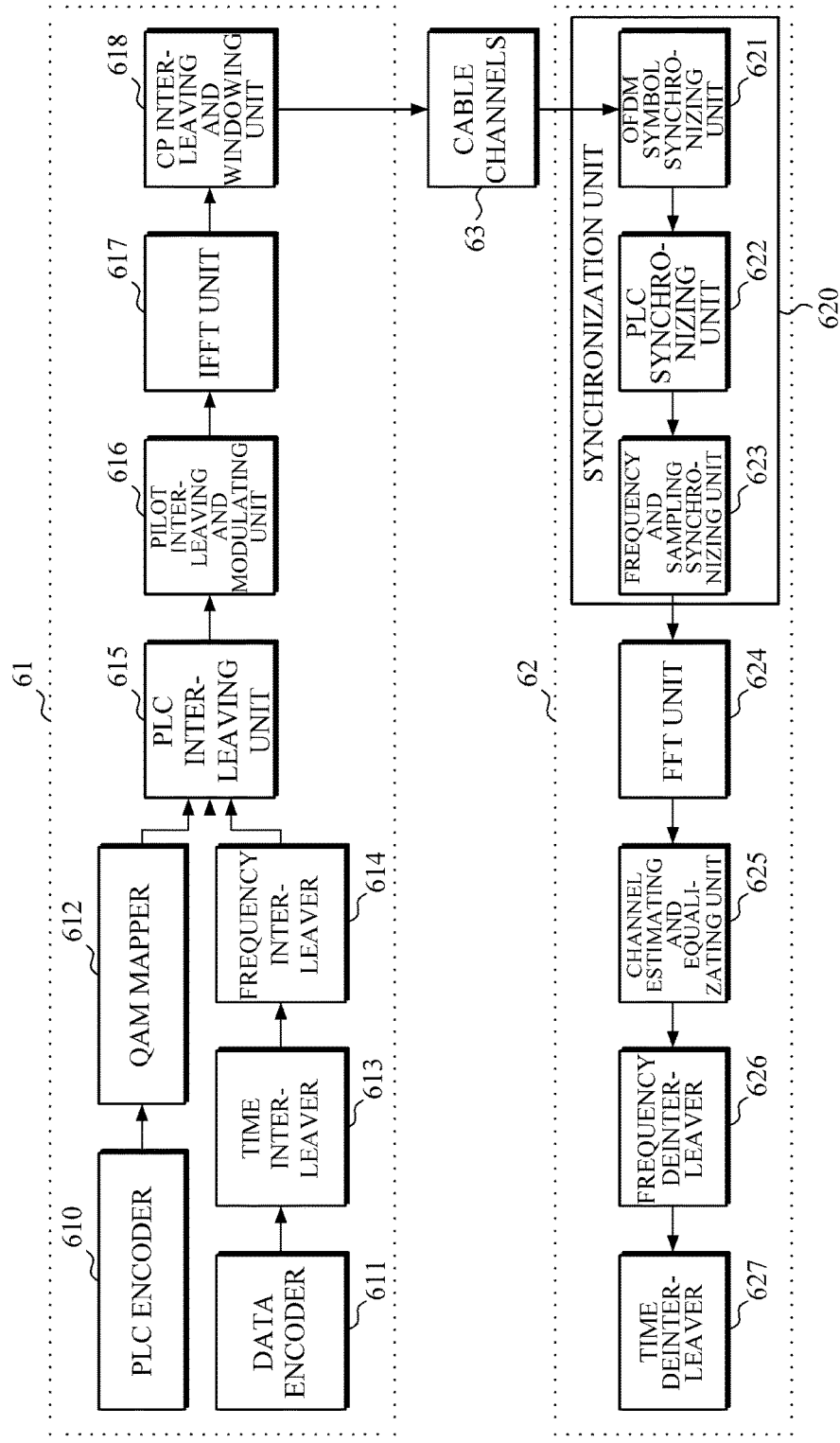
FIG. 6 is a block diagram illustrating a physical (PHY) transmitter and a PHY receiver according to an embodiment of the present invention.

FIG. 6 is a block diagram illustrating a PHY transmitter and a PHY receiver according to an embodiment of the present invention.

Referring to FIG. 6, when a down-stream is transmitted in a DOCSIS 3.1 cable network system, a PHY transmitter 61 inserts a PLC synchronization signal and transmits the down-stream, and a PHY receiver 62 acquires and synchronizes the PLC synchronization signal from the received down-stream.

The DOCSIS 3.1 cable network system according to an embodiment of the present invention uses a cross correlation method in order to acquire the PLC synchronization. For example, a cross correlation operation between the received signal and the PLC preamble signal may be performed on all received signals to obtain a cross correlation maximum value, an OFDM symbol in which the PLC preamble starts among the received signals may be detected from the received signal, and a frequency position in which the PLC subcarrier exists may be detected from the detected OFDM symbol.

According to a method for acquiring PLC synchronization according to an embodiment of the present invention, the cross correlation operation may be performed on the received signal with the length of 128 OFDM symbols which is the repetition period of the PLC preamble to thereby detect a maximum correlation value. Through this process, the maximum correlation value may be obtained when the position in which the PLC preamble subcarrier exists in the frequency domain and the OFDM symbol in which the PLC preamble exists exactly coincide with each other. In a method using a maximum value of cross correlation of a PLC preamble signal, PLC synchronization may be reliably acquired even at a low signal-to-noise ratio of 10 dB or less.

Hereinafter, when a down-stream is transmitted in a DOCSIS 3.1 network system, a configuration of the PHY transmitter and the PHY receiver for PLC synchronization acquisition will be described with reference to FIG. 6.

Referring to FIG. 6, the PHY transmitter 61 may be positioned in a network termination modem, and for example, may be positioned in the network termination modem 10 of FIG. 1. The PHY receiver 62 may be a cable modem, and for example, may be positioned in the cable modem 12 of FIG. 1. The PHY transmitter 61 and the PHY receiver 62 may be connected to each other through a cable channel 63.

The PHY transmitter 61 includes a PLC encoder 610, a data encoder 611, a QAM mapper 612, a time interleaver 613, a frequency interleaver 614, a PLC interleaving unit 615, a pilot interleaving and modulating unit 616, an inverse FFT (IFFT) unit 617, and a CP interleaving and windowing unit 618.

The PLC encoder 610 receives and encodes a PLC bit stream. The QAM mapper 612 maps the PLC bit stream encoded by the PLC encoder 610 onto constellation values to generate a PLC data signal.

The data encoder 611 receives and encodes a bit stream. The time interleaver 613 may interleave the bit stream encoded by the data encoder 611 over a predetermined interleaving depth to generate a time-interleaved data signal. The frequency interleaver 614 receives the data signal time-interleaved by the time interleaver 613 and interleaves the received data signal over a predetermined interleaving depth to generate a frequency-interleaved data signal.

The PLC interleaving unit 615 receives the PLC data signal mapped by the QAM mapper 612 and the data signal interleaved by the time interleaver 613 and the frequency interleaver 614 to interleave a PLC preamble signal into the PLC data signal. The pilot interleaving and modulating unit 616 receives the PLC signal in which the PLC preamble is interleaved, interleaves a pilot signal, and modulates the pilot signal. The pilot signal may be used in frequency synchronization, sampling synchronization, channel estimation and equalization, and the like.

The IFFT unit 617 performs an IFFT on the modulated signal to convert a frequency domain into a time domain. The CP interleaving and windowing unit 618 interleaves a CP acting as a guard interval to the signal on which the IFFT has been performed and performs a windowing process, and thereby transmits the finally obtained signal to the PHY receiver 62 via the cable channel 63.

The PHY receiver 62 may include a synchronizing unit 620, an FFT unit 624, a channel estimating and equalizing unit 625, a frequency deinterleaver 626, and a time deinterleaver 627, and the synchronizing unit 620 may include an OFDM symbol synchronizing unit 621, a PLC synchronizing unit 622, and a frequency and sampling synchronizing unit 623.

The OFDM symbol synchronizing unit 621 receives a signal from the PHY transmitter 61 and acquires OFDM symbol synchronization from the received signal. An auto correlation between OFDM symbols may be used to acquire the OFDM symbol synchronization. The PLC synchronizing unit 622 receives the signal from which the OFDM symbol synchronization has been acquired by the OFDM symbol synchronizing unit 621 and acquires PLC synchronization. The PLC synchronizing unit 622 according to an embodiment of the present invention performs a cross correlation operation between the received signal and a PLC preamble signal, detects a symbol in which the PLC preamble signal exists from the received signal, and detects a frequency position in which the PLC subcarrier exists from the detected symbol, and thereby acquires the PLC synchronization. The PLC preamble signal on which the cross correlation operation is to be performed with the received signal may be a signal that is obtained by converting a two-dimensional (2D) signal into a one-dimensional (1D) signal. The received signal on which the cross correlation operation is to be performed with the PLC preamble signal may have the same size as the PLC preamble signal. The received signal on which the cross correlation operation is to be performed with the PLC preamble signal may be the signal that is obtained by converting the 2D signal into the 1D signal.

The PLC synchronizing unit 622 according to an embodiment obtains a position of a symbol having a cross correlation maximum value, and obtains a position of a frequency subcarrier having a cross correlation maximum value. The symbol position having the cross correlation maximum value may be determined as a first symbol position of the PLC preamble signal, and the position of the subcarrier on a frequency axis having the cross correlation maximum value may be determined as a frequency value at which the PLC preamble signal starts.

The PLC synchronizing unit 622 according to an embodiment divides the received signal into a real part and an imaginary part, performs the cross correlation operation between the PLC preamble signal and each of the received signal in the real part and the received signal in the imaginary part, and generates a cross correlation sum by summing the cross correlation value in the real part and the cross correlation value in the imaginary portion at the same sample position.

The frequency and sampling synchronizing unit 623 receives the signal from which the OFDM symbol synchronization has been acquired by the OFDM symbol synchronizing unit 621, and compensates for a frequency offset and a sampling offset. The FFT unit 624 receives the synchronized signal from the frequency and sampling synchronizing unit 623, and performs an FFT on the received signal to convert the time domain to the frequency domain.

The channel estimating and equalizing unit 625 receives the received signal on which the FFT has been performed by the FFT unit 624 to estimate a channel, and equalizes the channel using the estimated channel. At this point, the channel estimating and equalizing unit 625 may detect a pilot signal among received signals, and perform channel estimation based on the detected pilot signal. The channel estimating and equalizing unit 625 according to an embodiment detects the position of the pilot signal arranged with respect to the PLC preamble signal from the received signal to extract a pattern of the pilot signal, and estimates and equalizes the channel using the extracted pilot signal.

The frequency deinterleaver 626 receives the output of the channel estimating and equalizing unit 625 and performs reverse interleaving on the received output, and thereby generates a signal on which frequency reverse interleaving is performed. The time deinterleaver 627 receives the frequency reverse interleaved signal from the frequency deinterleaver 626 and performs reverse interleaving on the received signal, and thereby generates a signal on which time reverse interleaving is performed.

Figure 7:
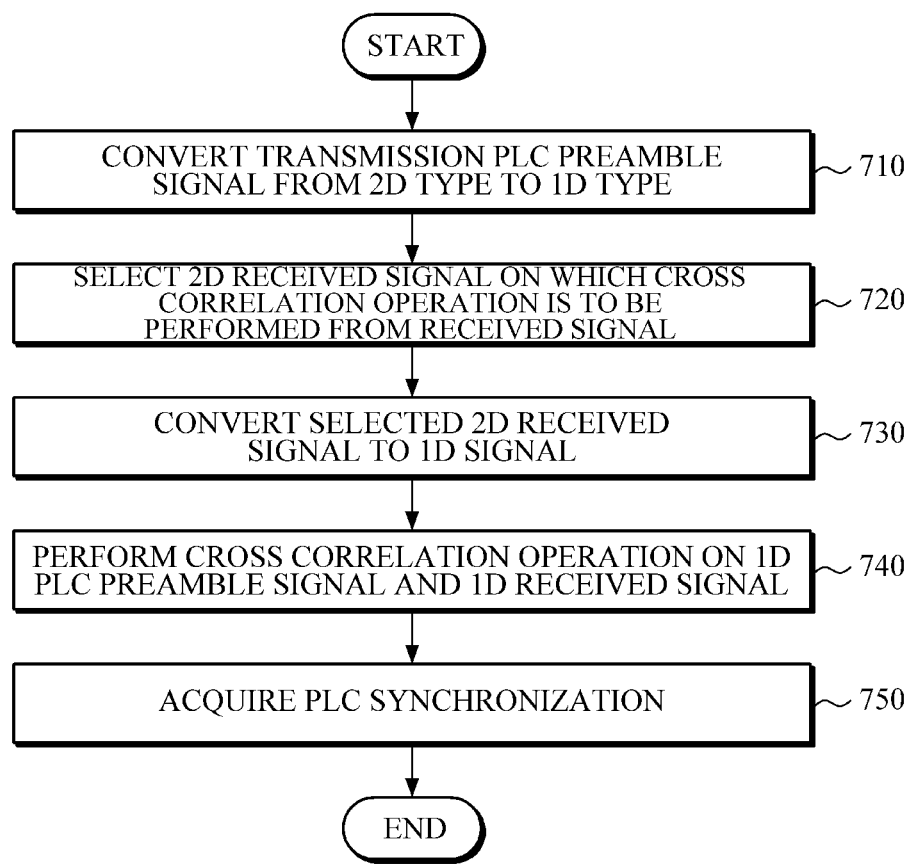
FIG. 7 is a flowchart illustrating a method for acquiring synchronization in a cable network system according to an embodiment of the present invention.

FIG. 7 is a flowchart illustrating a method for acquiring synchronization in a cable network system according to an embodiment of the present invention.

Figure 8:
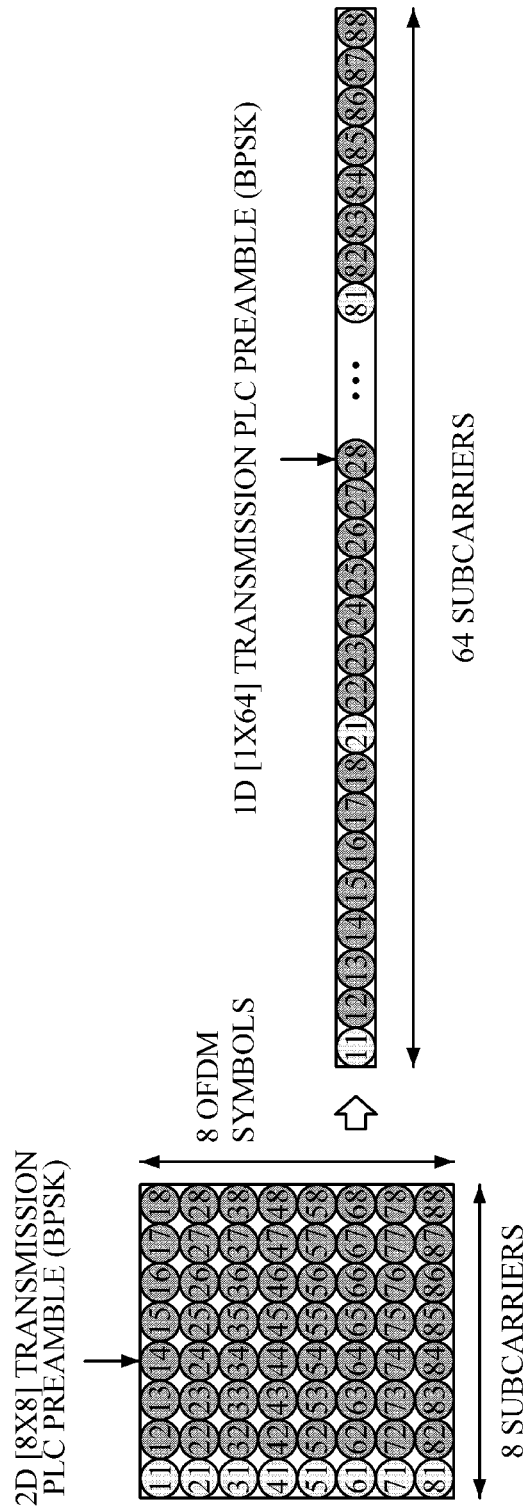
FIG. 8 is a reference diagram illustrating an example of converting a two-dimensional (2D) PLC preamble signal into a one-dimensional (1D) signal in a 4K-FFT mode according to an embodiment of the present invention.
Figure 9:
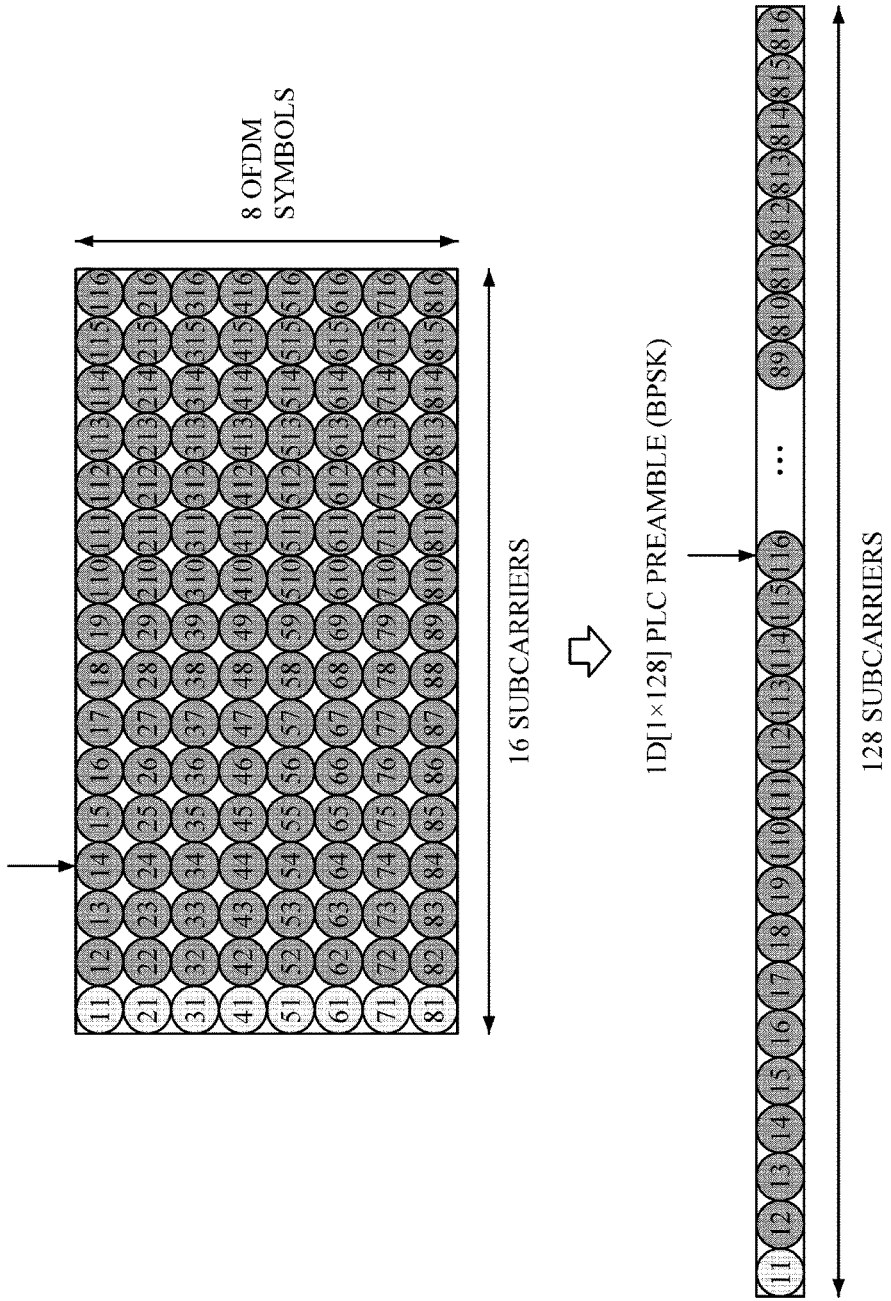
FIG. 9 is a reference diagram illustrating an example of converting a 2D PLC preamble signal into a 1D signal in an 8K-FFT mode according to an embodiment of the present invention.

Referring to FIGS. 6 and 7, the PHY receiver 62 converts a PLC preamble signal from a 2D type to a 1D type (S710). For example, the PLC preamble signal has a 2D type with a size [8×8] in a 4K-FFT and has a 2D type with a size [8×16] in an 8K-FFT mode, as shown in FIGS. 8 and 9. The 2D PLC preamble signal is converted into the 1D PLC preamble signal for performing a cross correlation operation on a received signal.

Next, the PHY receiver 62 selects a received signal on which the cross correlation operation is to be performed with the PLC preamble signal from received signals (S720). At this point, a received signal having the same size as the PLC preamble signal may be selected from the receive signals. As described above with reference to FIGS. 2 and 3, the repetition period of the PLC preamble signal is the 128 OFDM symbols, and therefore the received signal having the size of at least 128 OFDM symbols may be selected. Accordingly, at least one PLC preamble signal may exist within the received 128 OFDM symbols. A method of selecting a received signal on which a cross correlation operation is to be performed with the PLC preamble signal from received signals of the 4K-FFT mode will be described later with reference to FIG. 10, and a method of selecting a received signal on which a cross correlation operation is to be performed with the PLC preamble signal from received signals of the 8K-FFT mode will be described later with reference to FIG. 11.

Next, the PHY receiver 62 converts the selected received signal from a 2D type to a 1D type (S730). An example of converting the selected 2D received signal into the 1D received signal will be described with reference to FIGS. 12 and 13.

Next, the PHY receiver 62 performs the cross correlation operation on the 1D PLC preamble signal and the selected 1D received signal (S740). The PLC preamble signal and the 1D received signal on which the cross correlation operation is to be performed have the same size.

In operation S740 of the cross correlation operation, the PHY receiver 62 may perform the cross correlation operation on the PLC preamble signal with each of a real part and an imaginary part of the received signal. To this end, the received signal is divided into the real part and the imaginary part, two signals of the two parts are converted from a 2D signal type into a 1D signal type, and then the cross correlation operation may be performed on each of the two converted signals and the PLC preamble signal. Next, by summing a cross correlation value of the PLC preamble signal and the real part of the received signal and a cross correlation value of the PLC preamble signal and the imaginary part of the received signal with the same position, a cross correlation sum signal may be generated. Next, a maximum value in the cross correlation sum signal, an OFDM symbol number in which the maximum value is obtained, and a position of a subcarrier on a frequency axis in which the maximum value is obtained are obtained.

By applying the above-described process to all of the [8×8] received signals (the 4K-FFT mode) and the [8×16] received signals (the 8K-FFT mode) obtained in operation S720 of selecting the 2D received signal on which the cross correlation operation is to be performed, each of the cross correlation maximum value obtained in each case, the OFDM symbol number in which the maximum value is obtained, and the position of the subcarrier on the frequency axis in which the maximum is obtained may be obtained. For example, by searching for the cross correlation maximum value obtained with respect to all of the [8×8] received signals (the 4K-FFT mode) and the [8×16] received signals (the 8K-FFT mode), an OFDM symbol number in which the cross correlation maximum value is obtained and the position of the subcarrier on the frequency axis are obtained.

Next, PLC synchronization is acquired using the result of the cross correlation operation (S750). At this point, the OFDM symbol number in which the cross correlation maximum value is obtained may be a first OFDM symbol of the PLC preamble, and the position of the subcarrier on the frequency axis having the cross correlation maximum value are obtained may be a frequency value at which the PLC preamble starts. Through the above-described process, the OFMD symbol in which the PLC preamble exists and the position of the subcarrier of the frequency domain in which a PLC subcarrier exists, may be obtained, thereby acquiring the PLC synchronization.

FIG. 8 is a reference diagram illustrating an example of converting a 2D PLC preamble signal into a 1D signal in a 4K-FFT mode according to an embodiment of the present invention, and FIG. 9 is a reference diagram illustrating an example of converting a 2D PLC preamble signal into a 1D signal in an 8K-FFT mode according to an embodiment of the present invention.

Referring to FIGS. 8 and 9, in order to convert a 2D PLC preamble signal into a 1D PLC preamble signal in the 4K-FFT mode and the 8K-FFT mode, a subcarrier of a second row is arranged next to a rightmost subcarrier of a first row, and a subcarrier of a third row is arranged next to the subcarrier of the second row. This process is repeated up to fourth to eighth rows, thereby obtaining a 1D PLC preamble signal having a size [1×64] or a 1D PLC preamble signal having a size [1×128].

Figure 10:
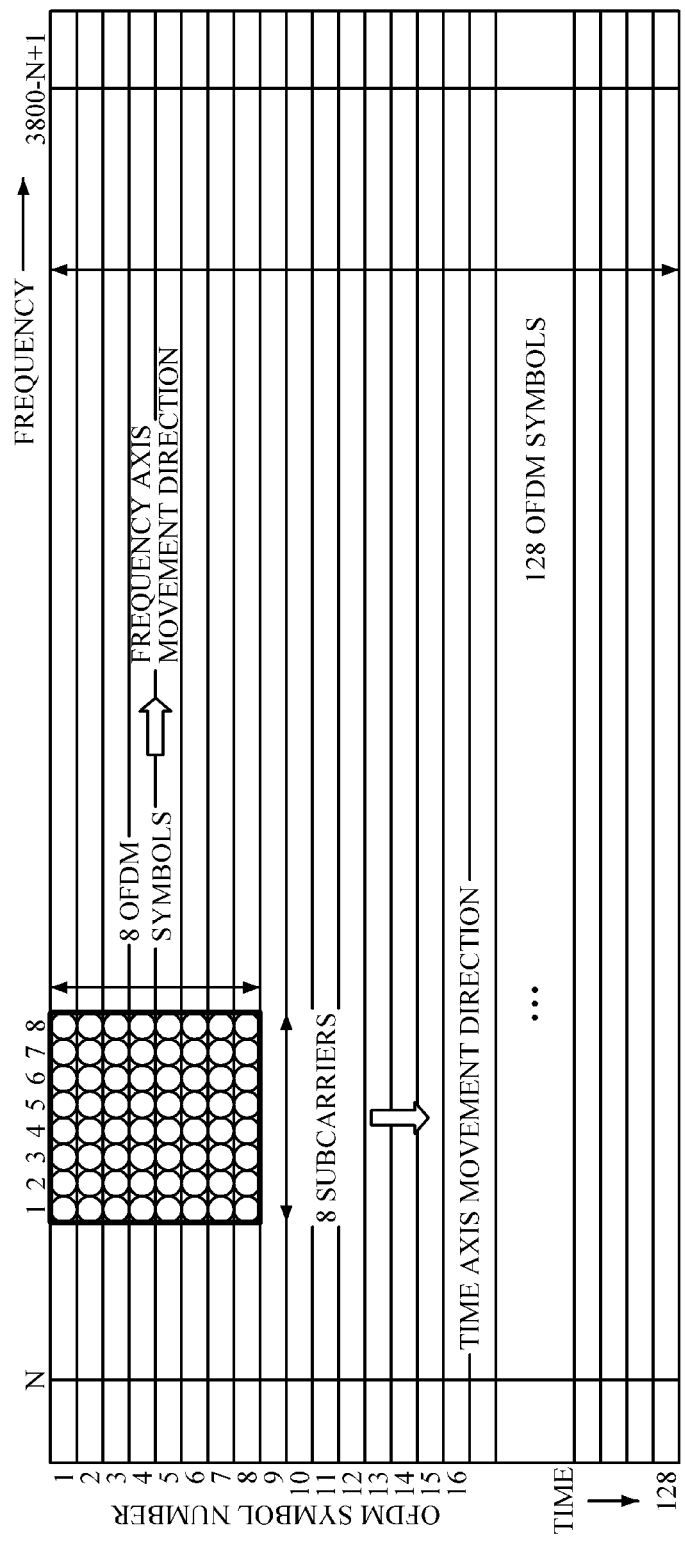
FIG. 10 is a structure diagram for describing an example of selecting a received signal on which a cross correlation operation is to be performed among received signals in a 4K-FFT mode according to an embodiment of the present invention.
Figure 11:
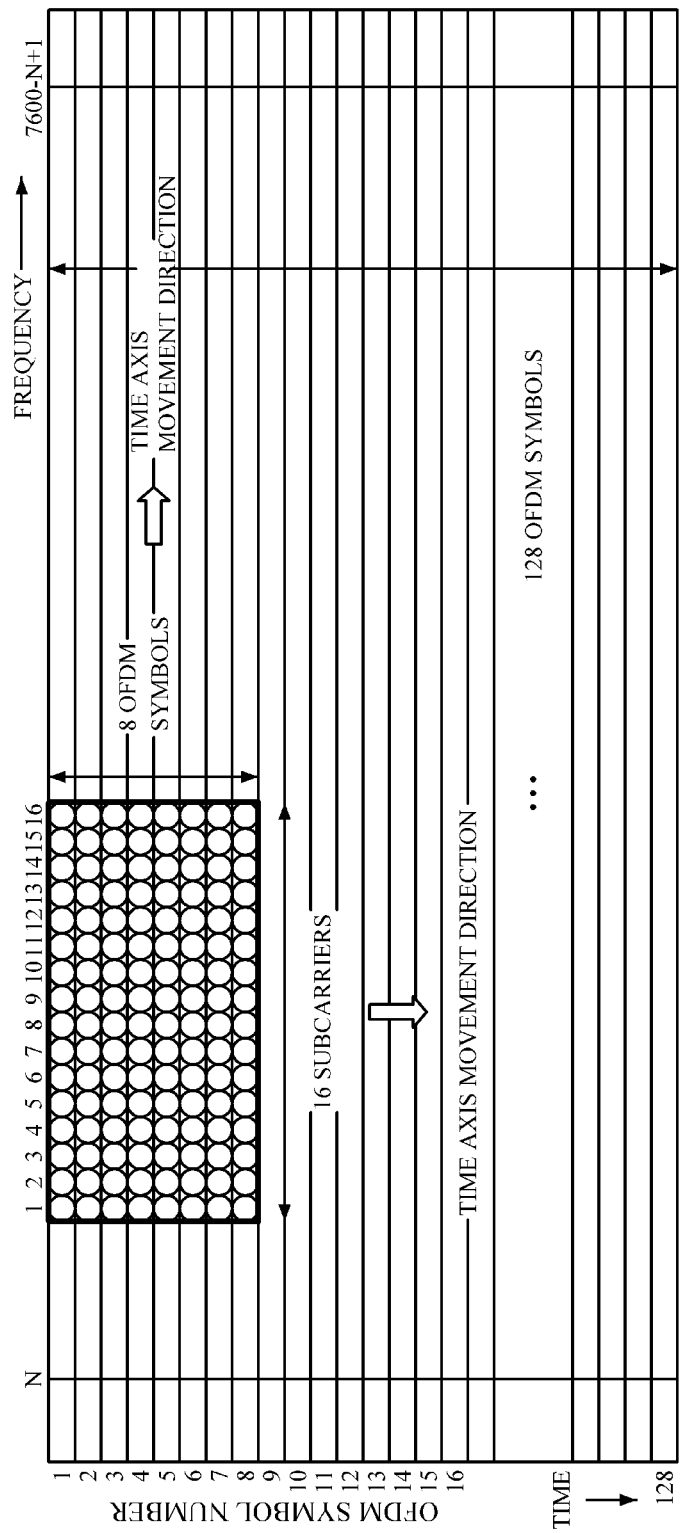
FIG. 11 is a structure diagram for describing an example of selecting a received signal on which a cross correlation operation is to be performed among received signals in an 8K-FFT mode according to an embodiment of the present invention.

FIG. 10 is a structure diagram for describing an example of selecting a received signal on which a cross correlation operation is to be performed among received signals in a 4K-FFT mode according to an embodiment of the present invention, and FIG. 11 is a structure diagram for describing an example of selecting a received signal on which a cross correlation operation is to be performed among received signals in an 8K-FFT mode according to an embodiment of the present invention.

As to a selection range of the received signals in a frequency-axis direction, since the PLC signal has a bandwidth of 6 MHz, in a range in which the 6 MHz PLC bandwidth may exist in the frequency-axis direction, the PLC signal may have a signal having a size [8×8] in a case of the 4K-FFT mode and exist with an interval of 1 MHz in a range (N to (3800−N+1)), as shown in FIG. 10.

In the case of the 8K-FFT mode, the PLC signal may have a signal having a size of [8×16] and exist with an interval of 1 MHz in a range of (N to (7800−N+1)), as shown in FIG. 11. The number of subcarriers existing within 1 MHz is 20 in the case of the 4K-FFT mode and 40 in the case of the 8K-FFT mode.

Accordingly, a range for selecting the signal having a size [8×8] in the frequency-axis direction in the 4K-FFT mode reaches up to the position of (3800−N+1) while the position is increased in units of 20 subcarriers with respect to a starting point N. a range for selecting the signal having a size [8×16] in the frequency-axis direction in the 8K-FFT mode reaches up to the position of (7600−N+1) while the position is increased in units of 40 subcarriers with respect to the starting point N.

As to a selection range of the received signal in a time-axis direction, since the PLC signal has a bandwidth of 6 MHz of 8 OFDM symbols, each of the received signal having a size [8×8] in the 4K-FFT mode and the received signal having a size of [8×16] in the 8K-FFT mode may be extracted from 8 consecutive OFDM symbols including a corresponding OFDM symbol with an increment of one OFDM symbol unit starting from an OFDM symbol number 1 with respect to a total of 128 OFDM symbols, and the extracted received signals may be applied to cross correlation.

Figure 12:
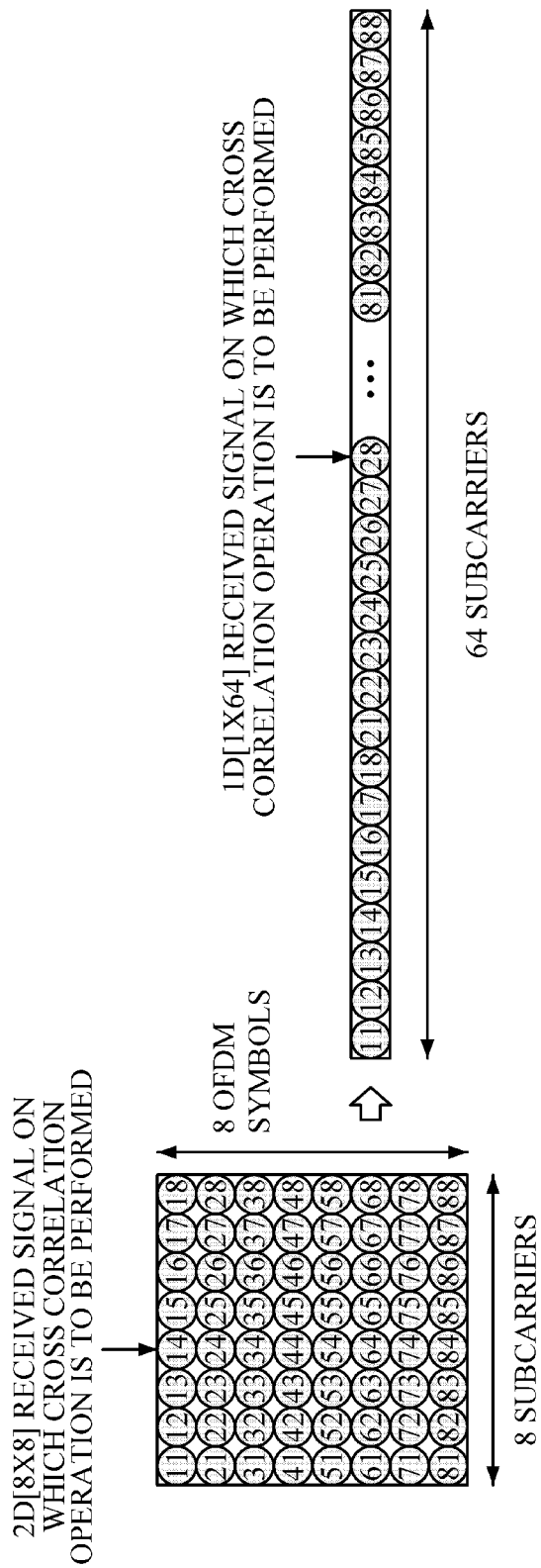
FIG. 12 is a reference diagram illustrating an example of converting a 2D received signal on which a cross correlation operation is to be performed into a 1D signal in a 4K-FFT mode according to an embodiment of the present invention.

FIG. 12 is a reference diagram illustrating an example of converting a 2D received signal on which a cross correlation operation is to be performed into a 1D signal in a 4K-FFT mode according to an embodiment of the present invention, and FIG. 13 is a reference diagram illustrating an example of converting a 2D received signal on which a cross correlation operation is to be performed into a 1D signal in an 8K-FFT mode according to an embodiment of the present invention.

In the 4K-FTT mode, as to the 8 consecutive OFDM symbols in the received signals, subcarriers in the same 8 consecutive frequency positions may be extracted from the 8 OFDM symbols, and cross correlation may be applied to the PLC preamble signal and the extracted subcarriers. Accordingly, when the 8 subcarriers are selected from the 8 consecutive OFDM symbols in the received signal, the 2D received signal of FIG. 12 may be obtained. In order to convert this 2D received signal into a 1D signal applied to cross correction, a subcarrier of a second row is arranged next to a rightmost subcarrier of a first row, and a subcarrier of a third row is arranged next to the subcarrier of the second row. This process is repeated up to fourth to eighth rows, thereby obtaining a 1D received signal having a size [1×64].

In the 8K-FFT mode, as to the 8 consecutive OFDM symbols in the received signals, subcarriers in the same 16 consecutive frequency positions may be extracted from the 8 OFDM symbols, and cross correlation may be applied to the PLC preamble signal and the extracted subcarriers. Accordingly, when the 16 subcarriers are selected from the 8 consecutive OFDM symbols in the received signal, the 2D received signal of FIG. 13 may be obtained. In order to convert this received signal into a 1D signal applied to cross correction, a subcarrier of a second row is arranged next to a rightmost subcarrier of a first row, and a subcarrier of a third row is arranged next to the subcarrier of the second row. This process is repeated up to fourth to eighth rows, thereby obtaining a 1D received signal having a size [1×128].

According to an embodiment, by using cross correlation of the received signal and a transmission channel preamble signal in the cable network system, channel synchronization may be reliably acquired even at a low signal-to-noise ratio of about 10 dB. In addition, by obtaining a position of a scattered pilot signal with respect to the transmission channel preamble, the obtained position of the scattered pilot signal may be applied to frequency synchronization, sampling synchronization, and channel estimation and equalization.

A number of examples have been described above. Nevertheless, it should be understood that various modifications may be made thereto. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for acquiring synchronization in a cable network, comprising:
   receiving, by a physical (PHY) receiver, a signal from a PHY transmitter; and
   acquiring, by the PHY receiver, channel synchronization when a symbol in which a channel preamble exists is detected from the received signal and a position of a frequency at which a channel subcarrier exists is detected from the detected symbol by performing a cross correlation operation on the received signal and the channel preamble,
   wherein the acquiring of the channel synchronization includes obtaining a position of a symbol having a cross correlation maximum value, and obtaining a subcarrier position on a frequency axis having the cross correlation maximum value.

2. The method for acquiring synchronization according to claim 1, wherein the channel preamble is a PHY layer link channel (PLC) preamble, the channel subcarrier is a PLC subcarrier, and the channel synchronization is PLC synchronization.

3. The method for acquiring synchronization according to claim 1, further comprising: converting the channel preamble on which the cross correlation operation is to be performed with the received signal from a two-dimensional (2D) type to a one-dimensional (1D) type.

4. The method for acquiring synchronization according to claim 1, further comprising: converting the received signal on which the cross correlation operation is to be performed with the channel preamble from a two-dimensional (2D) type to a one-dimensional (1D) type.

5. The method for acquiring synchronization according to claim 1, further comprising: selecting a received signal having the same size as the channel preamble from received signals.

6. The method for acquiring synchronization according to claim 5, wherein the selecting of the received signal includes selecting the received signal on which the cross correlation operation is to be performed in a unit of a signal with a preset size, the received signal being increased by a preset number of subcarriers with an increment of a preset size starting from a starting point of a PLC bandwidth in the received signal.

7. The method for acquiring synchronization according to claim 1, wherein the acquiring of the channel synchronization includes dividing the received signal into a real part and an imaginary part, performing the cross correlation operation on the channel preamble and each of the received signal in the real part and the received signal in the imaginary part, and generating a cross correlation sum by summing a real part cross correlation value and an imaginary part cross correlation value at the same sample position.

8. The method for acquiring synchronization according to claim 1, wherein the acquiring of the channel synchronization includes determining the position of the symbol having the cross correlation maximum value as a first symbol position of the channel preamble and the subcarrier position on the frequency axis having the cross correlation maximum value as a frequency value at which the channel preamble starts.

9. The method for acquiring synchronization according to claim 1, further comprising:
   extracting a pattern of a pilot signal by detecting a position of the pilot signal arranged with respect to the channel preamble in the received signal; and
   estimating and equalizing a channel using the extracted pilot signal.

10. A PHY receiver in a cable network, comprising:
    one or more processors that process computer executable program code embodied in non-transitory computer readable storage media, the computer executable program code comprising:
    synchronizing program code that acquires channel synchronization when a symbol in which a channel preamble exists is detected from a signal received from a PHY transmitter and a position of a frequency at which a channel subcarrier exists is detected from the detected symbol by performing a cross correlation operation on the received signal and the channel preamble,
    wherein the synchronizing program code obtains a position of a symbol having a cross correlation maximum value, and obtains a subcarrier position on a frequency axis having the cross correlation maximum value.

11. The PHY receiver according to claim 10, wherein the channel preamble is a PLC preamble, the channel subcarrier is a PLC subcarrier, and the channel synchronization is PLC synchronization.

12. The PHY receiver according to claim 10, wherein the synchronizing program code converts the channel preamble on which the cross correlation operation is to be performed with the received signal from a 2D type to a 1D type, and converts the received signal on which the cross correlation operation is to be performed with the channel preamble from a 2D type to a 1D type.

13. The PHY receiver according to claim 10, wherein the synchronizing program code selects a received signal having the same size as the channel preamble from received signals.

14. The PHY receiver according to claim 10, wherein the synchronizing program code divides the received signal into a real part and an imaginary part, performs the cross correlation operation on the channel preamble and each of the received signal in the real part and the received signal in the imaginary part, and generates a cross correlation sum by summing a real part cross correlation value and an imaginary part cross correlation value at the same sample position.

15. The PHY receiver according to claim 10, wherein the synchronizing program code determines the position of the symbol having the cross correlation maximum value as a first symbol position of the channel preamble and the subcarrier position on the frequency axis having the cross correlation maximum value as a frequency value at which the channel preamble starts.

16. The PHY receiver according to claim 10, further comprising: channel estimating and equalizing program code that extracts a pattern of a pilot signal by detecting a position of the pilot signal arranged with respect to the channel preamble in the received signal, and estimates and equalizes a channel using the extracted pilot signal.

* * * * *